. United States Patent [19]

Schauber et al.

[11] Patent Number: 5,851,967
[45] Date of Patent: Dec. 22, 1998

[54] DISPERSANT VISCOSITY INDEX IMPROVING ADDITIVE FOR LUBRICATING OILS

[76] Inventors: Claude C. Schauber, 85 rue Principale, 67160 Riedseltz, France; Nguyen Dinh Truong, Villa no 6, 1 Chemin du Castellet, 06450 Le Rouret, France; David Sterett Moorman, 5311 Bayway Dr., Baytown, Tex. 77520

[21] Appl. No.: 790,183

[22] Filed: Jan. 29, 1997

[51] Int. Cl.$^6$ .................................................. C10N 145/10
[52] U.S. Cl. ............................................ 508/469; 525/303
[58] Field of Search ........................... 508/469; 525/303; C10M 145/14

[56] References Cited

U.S. PATENT DOCUMENTS

| | | | |
|---|---|---|---|
| 3,304,260 | 2/1967 | Fields et al. | 508/469 |
| 3,729,439 | 4/1973 | Parker | 524/533 |
| 3,821,145 | 6/1974 | Walus . | |
| 4,282,132 | 8/1981 | Benda et al. . | |
| 4,413,037 | 11/1983 | Tobias . | |
| 5,190,805 | 3/1993 | Atherton et al. | 428/195 |
| 5,288,809 | 2/1994 | Christner et al. | 525/309 |
| 5,403,894 | 4/1995 | Tsai et al. . | |

FOREIGN PATENT DOCUMENTS

| | | |
|---|---|---|
| 0 123 575 A | 10/1984 | European Pat. Off. . |
| 0 292 652 A | 11/1988 | European Pat. Off. . |
| 0 348 565 A | 1/1990 | European Pat. Off. . |
| 0 452 998 A | 10/1991 | European Pat. Off. . |
| 0 453 581 A | 10/1991 | European Pat. Off. . |
| 453581 | 10/1991 | European Pat. Off. . |
| 0 522 791 A | 1/1993 | European Pat. Off. . |
| 0 569 639 A | 11/1993 | European Pat. Off. . |
| 0711 790 A2 | 3/1995 | European Pat. Off. . |
| 1 189 281 | 4/1970 | United Kingdom . |

*Primary Examiner*—Jacqueline V. Howard
*Assistant Examiner*—Cephia D. Toomer
*Attorney, Agent, or Firm*—Oblon, Spivak, McClelland, Maier & Neustadt, P.C.

[57] ABSTRACT

The present invention provides dispersant viscosity index improving additives for lubricating oils. The additives are copolymers comprising from 92 weight percent to 98 weight percent of a polymer backbone and from 2 weight percent to 8 weight percent branches grafted onto the polymer backbone.

4 Claims, No Drawings

DISPERSANT VISCOSITY INDEX IMPROVING ADDITIVE FOR LUBRICATING OILS

The present invention is concerned with dispersant viscosity index improving additives for lubricating oils.

Lubricating oil compositions for use in internal combustion engines and automatic transmissions typically include polymeric additives for improving the viscosity index of the lubricating composition, that is, modifying the relationship between temperature and the viscosity of the oil composition to reduce the temperature dependence of the viscosity, and to provide "dispersant" properties, that is, to allow contaminant particles to remain suspended in the oil composition.

The present invention provides polymers which exhibit viscosity index improvement, high dispersancy, good oxidative stability and high solubility in a number of mineral oil base stocks.

According to the present invention there is provided a polymer, which comprises from 92 weight percent ("wt %") to 98 wt % of a polymer backbone, said polymer backbone comprising repeating units derived from one or more ($C_1$–$C_{24}$)alkyl (meth)acrylate monomer, and from 2 wt % to 8 wt % branches grafted onto the polymer backbone, said branches being derived from one or more hydroxy($C_2$–$C_8$) alkyl (meth)acrylate monomer.

According to the present invention there also provided a method for making a dispersant viscosity index improving polymer, which comprises the steps of polymerizing a monomer charge comprising one or more ($C_1$–$C_{24}$)alkyl (meth)acrylate monomer in one or more oil soluble diluent to form a polymeric intermediate, and polymerizing one or more hydroxy($C_2$–$C_8$)alkyl (meth)acrylate monomer in one or more oil soluble diluent, e.g. the oil soluble diluent(s) used in preparing the polymeric intermediate, in the presence of the polymeric intermediate to form the dispersant viscosity index improving polymer.

In one embodiment of the method, the monomer charge comprises a mixture comprising the one or more ($C_1$–$C_{24}$) alkyl (meth)acrylate monomer.

As used herein, the term "(meth)acrylate monomer" refers collectively to acrylate monomers and methacrylate monomers. Commercially available alkyl (meth)acrylate monomers may be, and typically are, mixtures of esters. Such mixtures are referred to herein using the name of the ester species predominating in the mixture.

As used herein, "($C_1$–$C_{24}$)alkyl" means any straight or branched alkyl group having from 1 to 24 carbon atoms per group and ($C_1$–C?4)alkyl (meth)acrylate monomers include, for example, methyl methacrylate, ethyl methacrylate, butyl acrylate, butyl methacrylate, octyl methacrylate, nonyl methacrylate, decyl methacrylate, isodecyl methacrylate, undecyl methacrylate, lauryl methacrylate, tridecyl methacrylate, myristyl methacrylate, pentadecyl methacrylate, stearyl methacrylate, cetyl methacrylate, heptadecyl methacrylate, nonadecyl methacrylate, eicosyl methacrylate and mixtures of two or more of such materials.

As used herein, the term "hydroxy($C_2$–$C_8$)alkyl" means a hydroxyalkyl group having from 2 to 8 carbon atoms per group and suitable hydroxy($C_2$–$C_8$)alkyl (meth)acrylate monomers include, for example, 2-hydroxyethyl acrylate, 2-hydroxyethyl methacrylate, 2-hydroxypropyl acrylate, 2-hydroxypropyl methacrylate, 1-methyl-2-hydroxyethyl acrylate, 1-methyl-2-hydroxyethyl methacrylate, 2-hydroxybutyl acrylate, 2-hydroxybutyl methacrylate and mixtures of two or more of such materials. In a preferred embodiment, the hydroxy($C_2$-$C_8$)alkyl (meth)acrylate monomer is 2-hydroxypropyl methacrylate, I-methyl-2-hydroxyethyl methacrylate or a mixture thereof.

In a preferred embodiment of the polymer of the present invention, the polymer backbone includes from 65 parts by weight ("pbw") to 95 pbw repeating units derived from one or more ($C_1$–$C_{24}$)alkyl (meth)acrylate monomer per 100 pbw polymer backbone and from 5 pbw to 35 pbw repeating units derived from one or more styrenic monomer per 100 pbw polymer backbone.

As used herein, the term "styrenic monomer" means those polymerizable vinyl aromatic compounds having a single aromatic ring per molecule and mixtures of two or more such compounds and includes, for example, styrene, alkyl-substituted styrenes such as α-methyl styrene, α-ethyl styrene, p-methyl styrene and vinyl xylene, halogenated styrenes such as chlorostyrene, bromostyrene and dichlorostyrene, and other styrenes having one or more nonreactive substituents on the aromatic ring. In a preferred embodiment, the styrenic monomer is styrene.

In a more highly preferred embodiment of the polymer, the polymer backbone includes from 20 pbw to 90 pbw first repeating units, each derived from one or more ($C_7$–$C_{15}$) alkyl (meth)acrylate monomer, per 100 pbw polymer backbone, from 5 pbw to 45 pbw second repeating units, each derived from one or more ($C_{16}$–$C_{24}$)alkyl (meth) acrylate monomer, per 100 pbw polymer backbone, and from 5 pbw to 35 pbw third repeating units, each derived from one or more styrenic monomer, per 100 pbw polymer backbone.

As used herein, "($C_7$–$C_{15}$)alkyl" means any straight or branched alkyl group having from 7 to 15 carbon atoms per group and ($C_7$–$C_{15}$)alkyl (meth)acrylate monomers include, for example, octyl methacrylate, nonyl methacrylate, decyl methacrylate, isodecyl methacrylate, undecyl methacrylate, lauryl methacrylate, tridecyl methacrylate, myristyl methacrylate, pentadecyl methacrylate and mixtures of two or more of such materials. In a preferred embodiment, the ($C_7$–$C_{15}$)alkyl (meth)acrylate monomer is isodecyl methacrylate, lauryl methacrylate, pentadecyl methacrylate or a mixture of two or more of such materials, more preferably isodecyl methacrylate.

As used herein, "($C_{16}$–$C_{24}$)alkyl" means any straight or branched alkyl group having 16 to 24 carbon atoms per group and ($C_{16}$–$C_{24}$)alkyl (meth)acrylate monomers include, for example, stearyl methacrylate, cetyl methacrylate, heptadecyl methacrylate, nonadecyl methacrylate, eicosyl methacrylate and mixtures of two or more of such materials. In a preferred embodiment, the ($C_{16}$–$C_{24}$)alkyl (meth)acrylate monomer is stearyl methacrylate, cetyl methacrylate or a mixture thereof, more preferably stearyl methacrylate.

In a still more highly preferred embodiment of the polymer, the polymer backbone includes from 20 pbw to 30 pbw first repeating units, each derived from one or more ($C_7$–$C_{15}$)alkyl (meth)acrylate monomer, per 100 pbw polymer backbone, from pbw to 42 pbw second repeating units, each derived from one or more ($C_{16}$–$C_{24}$)alkyl (meth) acrylate monomer, per 100 pbw polymer backbone, and from 25 pbw to 35 pbw third repeating units, each derived from one or more styrenic monomer, per 100 pbw polymer backbone.

A preferred embodiment of the polymer of the present invention includes from 95 weight percent to 96.5 weight percent polymer backbone, and from 3.5 weight percent to 5 weight percent branches, each derived from one or more hydroxy($C_9$–$C_8$)alkyl (meth)acrylate monomer, grafted onto the polymer backbone.

The polymeric intermediate may, for example, be made by free radical polymerization of a monomer charge comprising the above-described monomer(s), preferably a monomer mixture comprising selected relative amounts of the above-disclosed monomers, in one or more oil soluble hydrocarbon diluent in the presence of an effective amount of a first portion of one or more polymerization initiator.

In a preferred embodiment of the method of the present invention, the polymeric intermediate is formed by polymerizing a monomer mixture comprising 65 pbw to 95 pbw of one or more ($C_1$–$C_{24}$)alkyl (meth)acrylate monomer per 100 pbw total monomers of the monomer mixture, and from 5 pbw to 35 pbw of one or more styrenic monomer per 100 pbw total monomers of the monomer mixture.

In a more highly preferred embodiment of the method, the polymeric intermediate is formed by polymerizing a monomer mixture comprising from 20 pbw to 90 pbw of one or more ($C_7$–$C_{15}$)alkyl (meth)acrylate monomer per 100 pbw total monomers of the monomer mixture, from 5 pbw to 45 pbw of one or more ($C_{16}$–$C_{24}$)alkyl (meth)acrylate monomer per 100 pbw total monomers of the monomer mixture, and from 5 pbw to 35 pbw of one or more styrenic monomer per 100 pbw total monomers of the monomer mixture.

In a still more highly preferred embodiment of the method, the polymeric intermediate is formed by polymerizing a monomer mixture comprising from 20 pbw to 30 pbw of one or more ($C_7$–$C_{15}$)alkyl (meth)acrylate monomer per 100 pbw total monomers of the monomer mixture, from 35 pbw to 42 pbw of one or more ($C_{16}$–$C_{24}$)alkyl (meth)acrylate monomer per 100 pbw total monomers of the monomer mixture, and from 25 pbw to 35 pbw of one or more styrenic monomer per 100 pbw total monomers of the monomer mixture.

The diluent may be any inert oil soluble organic liquid and is preferably a hydrocarbon lubricating oil which is miscible with or identical to the lubricating oil base oil in which the additive is to be subsequently employed. In a preferred embodiment, the oil soluble diluent is a paraffinic or naphthenic neutral oil.

Suitable polymerization initiators include those initiators which dissociate upon relatively mild heating, e.g., at temperatures in the range of 70° C. to 140° C., to yield a free radical. Suitable initiators are known in the art and include, e.g., peroxides, hydroperoxides and related initiators such as benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, azo initiators such as, e.g., azo diisobutyronitrile, azo diisobutyramide, azobis($\alpha$, $\alpha$-dimethylvaleronitrile), azobis($\alpha$-methylbutyronitrile) and dimethyl, diethyl or dibutyl azobis(methylvalerate), and mixtures of two or more such initiators. The peroxide initiators are preferably used at a level of from about 0.01% to 3% by weight, based on the total weight of the monomer(s), and the azo initiators are preferably used at a level from about 0.01% to about 2% by weight, based on the total weight of the monomer(s).

The monomer or monomer mixture, diluent and polymerization initiator may be charged to a reaction vessel and heated with stirring, preferably under an inert, e.g., nitrogen, blanket to a temperature effective to dissociate the polymerization initiator, preferably a temperature from 80° C. to 150° C. The batch is then maintained at a temperature effective to dissociate the polymerization initiator, with stirring, for a time period effective to allow polymerization of the monomer, or monomers of the monomer mixture, to form the polymeric intermediate, e.g., for about 2 hours to about 12 hours.

In a preferred embodiment of the method, a total amount of from 0.1 pbw to 1.5 pbw of the polymerization initiator per 100 pbw total monomer, or monomers of the monomer mixture, used to make the polymeric intermediate is added to the reaction mixture. In a preferred embodiment of the method, the amount of polymerization initiator is split into several portions and the portions are added stepwise as the backbone polymerization step of the method of the present invention progresses.

One or more hydroxy($C_2$–$C_8$)alkyl (meth)acrylate monomer is then polymerized in one or more oil soluble diluent in the presence of the polymeric intermediate.

In a preferred embodiment, the hydroxy($C_2$–$C_8$)alkyl (meth)acrylate monomer(s) and an additional amount of polymerization initiator are charged to a reaction vessel containing the polymeric intermediate and the diluent and heated with stirring, preferably under an inert, e.g., nitrogen, blanket to a temperature effective to dissociate the additional polymerization initiator, preferably a temperature from about 80° C. to about 150° C. The batch is then maintained at a temperature effective to dissociate the additional polymerization initiator, with stirring, for a time period effective to allow polymerization of the hydroxy($C_2$–$C_8$)alkyl (meth) acrylate monomer(s) in the presence of the polymeric intermediate, e.g., for about 2 hours to about 12 hours.

In a preferred embodiment, the reaction mixture includes from 2 pbw to 8 pbw, more preferably 3.5 pbw to 5 pbw, hydroxy($C_2$–$C_8$)alkyl (meth)acrylate monomer(s) per 100 pbw combined monomers of the polymeric intermediate and added hydroxy($C_2$–$C_8$)alkyl monomer(s).

In a preferred embodiment, the reaction mixture includes from 0.1 pbw to 1.5 pbw of additional initiator per 100 pbw combined monomers of the polymeric intermediate and added hydroxy($C_2$–$C_8$)alkyl(meth)acrylate monomer(s). The additional amount of polymerization initiator may be the same polymerization initiator used in the polymerization of the polymer backbone or may be a second polymerization initiator.

In a preferred embodiment, the additional amount of polymerization initiator is split into several portions and the portions are added stepwise as the polymerization of the hydroxy($C_2$–$C_8$)alkyl(meth)acrylate monomer(s) progresses.

A viscous solution of a copolymer in the diluent is obtained as the product of the method of the present invention.

In a preferred embodiment, the copolymer exhibits a weight average molecular weight, determined, e.g., by gel permeation chromatography, from about 40,000 to about 1,000,000, more preferably, from about 100,000 to about 300,000.

In a preferred embodiment, the copolymer exhibits a number average molecular weight determined, e.g., by gel permeation chromatography, from about 20,000 to about 100,000, more preferably, from about 30,000 to about 80,000.

In a preferred embodiment, the copolymer exhibits a polydispersity factor, i.e., the ratio of the number average molecular weight of the copolymer to weight average molecular weight of the copolymer, of about 1.5 to about 10, more preferably, from about 1.5 to about 5.

In a preferred embodiment, the copolymer is supplied in the form of a solution of from about 40 weight percent to about 60 weight percent polymer solids in the oil soluble diluent.

The copolymer of the present invention is useful as a dispersant viscosity improving additive for lubricating oil compositions. The above-discussed copolymer solution may be diluted with a base oil, e.g., paraffinic solvent neutral mineral oils and naphthenic solvent neutral mineral oils, in a conventional manner, to provide a lubricating oil composition having the desired viscometric properties.

A lubricating oil composition of the present invention comprises 100 parts by weight of one or more base oil, and from 2 pbw to 20 pbw of one or more copolymer of the present invention (on the basis of polymer solids). Suitable base oils include paraffinic and naphthenic neutral oils.

In a more highly preferred embodiment, the lubricating oil composition of the present invention includes from 5 pbw to 15 pbw of one or more copolymer of the present invention (on the basis of polymer solids) per 100 pbw of base oil(s).

The lubricating oil composition of the present invention may further include other components known in the art, such as, e.g., antioxidants and detergents.

Lubricating compositions according to the present invention are useful as, e.g., automotive crankcase lubricants and automotive automatic transmission fluids.

Some embodiments of the present invention will now be described in detail in the following Examples.

EXAMPLES

Examples 1–6

(a) Example 1:

A copolymer was made by the method of the present invention.

A 1 liter reaction vessel was fitted with a thermometer, a temperature controller, a purge gas inlet, a water-cooled reflux condenser with a purge gas outlet, stirrer and an addition funnel.

First respective portions of a styrenic monomer (styrene, 39.22 grams (g)), a first alkyl (meth)acrylate monomer (isodecyl methacrylate, 34.30g), a second alkyl methacrylate monomer (stearyl methacrylate, 51.00 g), a first polymerization initiator (t-butyl perbenzoate, 0.26 g), a second polymerization initiator (74% benzoyl peroxide, 0.21 g), a chain transfer agent (n-dodecyl mercaptan, 0.16 g) and an oil soluble diluent (90 N solvent neutral mineral oil, 75 g) were each charged to the reaction vessel. The contents of the reaction vessel were then heated, with stirring and with a sparge of approximately 10 cubic centimeters nitrogen gas per minute, to 120° C. over a time period of 30 minutes.

Second portions of styrene (112.32 g), isodecyl methacrylate (98.24 g), stearyl methacrylate (146.06 g), t-butyl perbenzoate (0.74 g), 74% benzoyl peroxide (0.59 g), n-dodecyl mercaptan (0.44 g) were combined and mixed for 45 minutes in a closed vessel at room temperature to form a homogeneous monomer mixture.

When the contents of the reaction vessel reached 120° C., the monomer mixture was fed to the reactor at substantially uniform rate over a time period of about 150 minutes. At the end of the monomer feed, the reaction mixture was maintained at 120° C. for a first holding time period of 30 minutes and then an additional amount of t-butyl peroctoate (1.00 g) was added to the reaction vessel. The contents of the reaction vessel were then maintained at 120° C. for a second holding time period of 30 minutes.

Following the second holding time period, an additional amount of t-butyl peroctoate (1.00 g) was added to the reaction vessel. The contents of the reaction vessel were then maintained at 120° C. for a third holding time period of 30 minutes.

Following the third holding time period, a hydroxyalkyl (meth)acrylate monomer (hydroxypropyl methacrylate, 20 g) was added to the reaction vessel. The contents of the reaction vessel were then maintained at 120° C. for a fourth holding time period of 5 minutes.

Following the fourth holding time period, an additional amount of t-butyl peroctoate (1.00 g) was added to the reaction vessel. The contents of the reaction vessel were then maintained at 120° C. for a fifth holding time period of 30 minutes.

Following the fifth holding time period, an additional amount of t-butyl peroctoate (1.00 g) and an additional amount of diluent (150 N solvent neutral mineral oil, 45 g) were added to the reaction vessel. The contents of the reaction vessel were then maintained at 120° C. for a sixth holding time period of 30 minutes.

Following the sixth holding time period, an additional amount of t-butyl peroctoate (1.00 g) and an additional amount of diluent (150 N solvent neutral mineral oil, 45 g) were added to the reaction vessel. The contents of the reaction vessel were then maintained at 120° C. for a seventh and final holding time period of 60 minutes, allowed to cool to room temperature and then further diluted with an additional amount of diluent ((150 N solvent neutral mineral oil, 317 g).

The polymer-in-oil solution produced by the above described process exhibited a polymer solids content of 50 wt % and a kinematic viscosity, measured in accord with the method of ASTMf D445-88, of 1800 centiStokes (1 centiStoke=1×10$^{-6}$ m$^2$ s$^{-1}$) at 100° C. The polymer exhibited a weight average molecular weight of 156,500 and a number average molecular weight of 49,800, measured by gel permeation chromatography using a poly(styrene) standard for calibration.

(b) Examples 2–6:

The polymer compositions of Examples 2–6 were made by the method set forth above in Example 1, except that different relative amounts of hydroxypropyl methacrylate were used.

The respective amounts of hydroxypropyl methacrylate (HPMA) used to make each of the polymer compositions of Examples 1–6, expressed as a weight percent of the polymer composition (wt %), are set forth below in TABLE 1.

TABLE 1

| Example # | HPMA (wt %) |
|---|---|
| 1 | 4.2 |
| 2 | 3.2 |
| 3 | 4 |
| 4 | 5 |
| 5 | 5.2 |
| 6 | 6.2 |

Comparative Examples C1–C4

(a) Comparative Example 1:

A random copolymer was made by the method set forth below.

A 1 liter reaction vessel was fitted with a thermometer, a temperature controller, a purge gas inlet, a water-cooled reflux condenser with a purge gas outlet, stirrer and an addition funnel.

First respective portions of a styrenic monomer (styrene, 37.9 g), a first alkyl (meth)acrylate monomer (isodecyl methacrylate, 33.12 g), a second alkyl methacrylate monomer (stearyl methacrylate, 49.25 g), a hydroxyalkyl (meth) acrylate monomer (hydroxypropyl methacrylate, 7.5 g), a first polymerization initiator (t-butyl perbenzoate, 0.1 g), a second polymerization initiator (74% benzoyl peroxide, 0.27 g), a chain transfer agent (n-dodecyl mercaptan, 0.16 g) and an oil soluble diluent (90 N solvent neutral mineral oil, 50 g) were each charged to the reaction vessel. The contents of the reaction vessel were then heated, with stirring and with a sparge of approximately 10 cubic centimeters nitrogen gas per minute, to 120° C. over a time period of 30 minutes.

Second portions of styrene (113.85 g), isodecyl methacrylate (93.38 g), stearyl methacrylate (47.75 g), hydroxypropyl methacrylate (22.51 g), t-butyl perbenzoate (0.78 g), 74% benzoyl peroxide (0.54 g), n-dodecyl mercaptan (0.56 g) were combined and mixed for 45 minutes in a closed vessel at room temperature to form a homogeneous monomer mixture.

When the contents of the reaction vessel reached 120° C., the monomer mixture was fed to the reactor at substantially uniform rate over a time period of about 150 minutes. At the end of the monomer feed, the reaction mixture was maintained at 120° C. for a first holding time period of 30 minutes and then a solution of t-butyl peroctoate (1.5 g) in an oil soluble diluent (150N solvent neutral mineral oil, 110 g) was fed into the reaction vessel at a substantially uniform rate over a time period of 30 minutes. The contents of the reaction vessel were then maintained at 120° C. for a second holding time period of one hour. After the second holding time period, an additional amount of diluent (150N solvent neutral mineral oil, 348 g) was added to the reaction vessel and the contents of the reaction vessel were allowed to cool to room temperature.

The respective amounts of hydroxypropyl methacrylate (HPMA) and of a combination of 31.5 pbw styrene, 27.5 pbw isodecyl methacrylate and 41 pbw stearyl methacrylate (STYRENE/IDMA/SMA) used to make each of the polymer compositions of Comparative Examples C1–C4, expressed as a weight percent of the polymer composition (wt %), are set forth below in TABLE 2.

TABLE 2

| Comparative Example # | HPMA (wt %) | STYRENE/IDMA/SMA (wt %) |
|---|---|---|
| C1 | 4 | 96 |
| C2 | 5 | 95 |
| C3 | 6 | 94 |
| C4 | 7 | 93 |

Example 7

The performance of the polymer compositions of Examples 1–6 and Comparative Examples C1–C4 were evaluated with respect to viscosity index improvement, dispersancy, oxidative stability and oil solubility.

Viscosity Index Improvement

The compositions of Examples 1, 2 and 5 were each dissolved in a sufficient respective amount of 150N solvent neutral mineral oil to provide a homogeneous polymer-in-oil solution having a kinematic viscosity of about 14±0.5 centiStokes (cSt) at 100° C. The kinematic viscosity of the lubricating oil and of each of the polymer-in-oil solutions was measured at 100° C. and at 40° C. according to the method of ASTMi D445-88. The viscosity index of the oil and of each of the respective polymer in-oil solutions was determined according to ASTM Viscosity Index Table DS 39B.

The results of the viscosity index testing for each of the polymer compositions of Examples 1, 2 and 5 are set forth below in TABLE 3 as viscosity index of oil ($VI_i$), viscosity index of polymer-in-oil solution ($VI_f$), and viscosity index improvement attributable to the polymer (VII).

TABLE 3

| Example # | $VI_i$ | $VI_f$ | VII |
|---|---|---|---|
| 1 | 100 | 165 | 65 |
| 2 | 100 | 164 | 64 |
| 5 | 100 | 166 | 66 |

Dispersancy

The dispersant properties of polymer compositions of the present invention were characterized by determining the ability of several of the polymer compositions to disperse soot particles from used diesel engine crankcase lubricating oil.

Sample compositions for the dispersancy testing were prepared by mixing used oil (20 pbw per 100 pbw sample) in each of the respective compositions of Examples 3 and 4 and Comparative Examples C1—C4 and in 150N solvent neutral mineral oil to form a series of respective "non-water-containing" sample compositions and by mixing used oil (20 pbw per 100 pbw sample) and water (I pbw per 100 pbw sample), in each of the respective compositions of Examples 3 and 4 and Comparative Examples C1–C4 and in 150N solvent neutral mineral oil to form a series of respective "water-containing" sample compositions.

Aliquots (20 microliters) of each sample composition were each dropped onto respective filter paper disks (Durieux 122) under six different conditions, as set forth below:

1) first aliquot of each of the water-containing sample compositions was dropped onto a filter paper disk at 20° C.;
2) a second aliquot of each of the water-containing sample compositions was heated for 1 minute at 200° C. and then dropped onto a filter paper disk;
3) a third aliquot of each of the water-containing sample compositions was heated for 10 minutes at 200° C. and then dropped onto a filter paper disk;
4) a first aliquot of each of the non-water-containing sample compositions was dropped onto a filter paper disk at 20° C.;
5) a second aliquot of each of the non-water-containing sample compositions was heated for 10 minutes at 200° C. and then dropped onto a filter paper disk;
6) a third aliquot of each of the non-water-containing sample compositions was heated for 10 minutes at 250° C. and then dropped onto a filter paper disk.

The spotted filter paper disks were stored at room temperature for 48 hours and the diameter of the oil and soot spot on each of the filter paper disks was then measured.

The dispersant ability of each of the polymer compositions was evaluated by comparing the diameter of the spot produced by the polymer-containing sample composition to the diameter of the spot produced under the same conditions by the analogous sample composition lacking the polymer. The dispersancy value is the sum of the respective ratios of the diameter of the spot formed by the polymer containing sample composition to the diameter of the spot formed by the sample composition lacking the polymer obtained under each of the six different conditions set forth above, multiplied by a factor of 100. A higher dispersancy value is indicative of greater dispersancy.

The results of the dispersancy testing are set forth below in TABLE 4 for the compositions of Examples 3 and 4 and Comparative Examples C1–C4 as dispersancy value.

TABLE 4

| Example # | Dispersancy value |
|---|---|
| 3 | 320 |
| 4 | 240 |
| C1 | 185 |
| C2 | 176 |
| C3 | 193 |
| C4 | 197 |

Oxidative Stability

Lubricating oil compositions were made by mixing 150N solvent neutral mineral oil containing 10.1 pbw of a dispersant/inhibitor package (API SGCD) per 89.9 pbw oil and an amount of one of the dispersant polymer compositions of Examples 3, 4, C1 and C2 to provide a homogeneous solution having a kinematic viscosity of about 14±0.5 centiStokes (cSt) at 100° C., when measured according to ASTM D 445-88. Each of the lubricating oil compositions was heated to 250° C. and maintained at that temperature for a period of 2 hours. The kinematic viscosity of each of the lubricating oil compositions was measured according to ASTM D 445-88 at 20° C. prior to the heating and again upon cooling to 20° C. after the heating.

The results of the oxidative stability testing for each of the polymer compositions of Examples 3 and 4 and Comparative Examples C1 and C2 are set forth below in TABLE 5 as viscosity prior to heating, expressed in centiStokes, ($KV_i$ (cSt)), viscosity after heating, expressed in centiStokes ($KV_f$ (cSt)) and viscosity increase during heating, expressed as a percentage of the viscosity prior to heating.

TABLE 5

| Polymer Composition, Example # | $KV_i$ (cSt) | $KV_f$ (cSt) | Viscosity Increase (%) |
|---|---|---|---|
| 3 | 14.05 | 14.47 | 3 |
| 4 | 14.30 | 14.87 | 4 |
| C1 | 14.18 | 21.66 | 53 |
| C2 | 14.44 | 30.17 | 110 |

Solubility

Copolymer compositions of Examples 3 and 4 and Comparative Examples C1 and C2 were each dissolved (5 wt % polymer solids) in each of several heavy mineral oils (330 N Total, 500 N Quaker State, 500 N British Petroleum, 600 N Total, 600 N Exxon and 600 N Petrocan). The kinematic viscosity of each solution was measured according to ASTM D 445-88 at 2°° C. A sample of each solution was then placed in a centrifuge tube having a capacity of 20 milliliters (mL). The solutions were then cooled to −10° C. and centrifuged at 10,000 revolutions per minute for 120 minutes.

The top 5 mL each sample volume was removed from the centrifuge tube using a syringe. The kinematic viscosity of each of the 5 mL samples of centrifuged solution was measured according to ASTM D 445-88 at 2°° C. and compared to the viscosity of the same sample prior to centrifugation. A difference in the respective kinematic viscosities of greater than ±0.2 cSt was taken as evidence of marginal solubility of the polymer in the oil.

Results of the solubility testing of the compositions of Examples 3 and 4 and Comparative Examples C1 and C2 in the 330 N Total, 500N British Petroleum, 600N Total and 600N Exxon oils are set forth below in TABLE 6, as the kinematic viscosity prior to centrifugation ($KV_i$), the kinematic viscosity after centrifugation ($KV_f$), and the difference between the kinematic viscosity prior to centrifugation and the kinematic viscosity after centrifugation ($\Delta KV$), each expressed in centiStokes (cSt). Each of the centrifuged solutions of the compositions of Examples 3 and 4 and Comparative Examples C1 and C2 in the 500 Quaker State and the 600 Petrocan oils were milky white in appearance, indicating poor solubility of the polymer in those oils under the test conditions, and the respective kinematic viscosities of those samples were not measured.

TABLE 6

| | 330 Total | | | 500 BP | | |
|---|---|---|---|---|---|---|
| Ex # | $KV_i$ (cSt) | $KV_f$ (cSt) | $\Delta KV$ (cSt) | $KV_i$ (cSt) | $KV_f$ (cSt) | $\Delta KV$ (cSt) |
| 3 | 14.23 | 14.14 | −0.04 | 17.41 | 17.47 | 0.05 |
| 4 | 13.83 | 13.83 | 0 | 16.94 | 16.97 | −0.01 |
| C1 | 15.42 | 14.18 | −1.24 | 20.33 | 14.02 | −6.31 |
| C2 | 15.90 | 12.19 | −3.71 | 19.12 | 12.46 | −6.66 |
| | 600 Total | | | 600 Exxon | | |
| Ex # | $KV_i$ (cSt) | $KV_f$ (cSt) | $\Delta KV$ (cSt) | $KV_i$ (cSt) | $KV_f$ (cSt) | $\Delta KV$ (cSt) |
| 3 | 19.53 | 19.55 | 0.02 | 22.61 | 22.59 | −0.01 |
| 4 | 19.03 | 18.97 | −0.06 | 18.73 | 18.69 | 0.02 |
| C1 | 20.74 | 14.21 | −6.52 | 21.47 | 13.28 | −8.19 |
| C2 | 20.82 | 13.63 | −7.19 | 21.37 | 12.97 | −8.41 |

We claim:

1. A graft copolymer, which comprises:

from 92 weight percent to 98 weight percent of a polymer backbone, said polymer backbone comprising from 65 parts by weight to 95 p)arts by weight, per 100 parts by weight polymer backbone, of repeating units derived from one or more ($C_1$–$C_{24}$)alkyl (meth)acrylate monomer; and from 5 parts by weight to 35 -parts by weight, per 100 parts by weight Polymer backbone, of repeating units derived from one or more styrenic monomer; and from 2 weight per cent to 8 weight percent of branches grafted onto the polymer backbone, said branches comprising one or more hydroxy($C_2$–$C_8$)alkyl (meth)acrylate monomer.

2. A graft copolymer comprising:

from 92 weight Percent to 98 weight percent of a polymer backbone; and from 2 weight per cent to 8 weight percent of branches grafted onto the polymer backbone, said branches comprising one or more hydroxy($C_2$–$C_8$)alkyl (meth)acrylate monomer:

wherein the polymer backbone comprises:

from 65 parts by weight to 95 parts by weight, per 100 parts by weight polymer backbone, of repeating units derived from one or more ($C_1$–$C_{24}$)alkyl (meth)acrylate monomer; and from 5 parts by weight to 35 parts by weight, per 100 parts by weight polymer backbone, of repeating units derived from one or more styrenic monomer:

wherein the $(C_1-C_{24})$alkyl (meth)acrylate monomer repeating units of the polymer backbone comprise:

from 20 parts by weight to 90 parts by weight of one or more $(C_7-C_{15})$alkyl (meth)acrylate monomer repeating units per 100 parts by weight polymer backbone; and from 5 parts by weight to 45 parts by weight of one or more $(C_{16}-C_{24})$alkyl (meth)acrylate monomer repeating units per 100 parts by weight polymer backbone.

3. A copolymer as claimed in claim 2, wherein:

the $(C_7-C_{15})$alkyl (meth)acrylate monomer(s) is/are isodecyl methacrylate, lauryl methacrylate, pentadecyl methacrylate or a mixture thereof;

the $(C_{16}-C_{24})$alkyl (meth)acrylate monomer(s) is/are stearyl methacrylate, cetyl methacrylate or a mixture thereof;

the styrenic monomer is styrene; and the hydroxy$(C_2-C_8)$alkyl (meth)acryalte monomer(s) is/are 2-hydroxypropyl methacrylate, 1-methyl-2-hydroxypropyl methacrylate or a mixture thereof.

4. A lubricating oil composition, which comprises:

100 parts by weight of base oil selected from one or more paraffinic neutral oil and naphthenic neutral oil; and from 2 parts by weight to 20 parts by weight of one or more copolymer as claimed in any of claims 1, 3 or 4.

* * * * *

UNITED STATES PATENT AND TRADEMARK OFFICE
CERTIFICATE OF CORRECTION

PATENT NO.   : 5,851,967
DATED        : December 22, 1998
INVENTOR(S)  : Claude C. Schauber et al.

It is certified that error appears in the above-identified patent and that said Letters Patent is hereby corrected as shown below:

Column 1,
Line 49, replace "(C1-C?4) alkyl" with -- $(C_1-C_{24})$ alkyl --.

Column 2,
Line 66, replace "$(C_9-C_8)$ alkyl" with -- $(C_2-C_8)$ alky --.

Column 6,
Line 27, replace "ASTMf" with -- ASTM --.

Column 7,
Line 62, replace "ASTMi" with -- ASTM --.

Column 10,
Line 44, replace "95 p) parts" with -- 95 parts --.

Column 12,
Line 7, replace "hydroxypropyl" with -- hydroxyethyl --.

Signed and Sealed this

Eleventh Day of January, 2005

JON W. DUDAS
*Director of the United States Patent and Trademark Office*